United States Patent
Lopes et al.

(10) Patent No.: US 7,436,373 B1
(45) Date of Patent: Oct. 14, 2008

(54) PORTABLE RECEIVER FOR RADAR DETECTION

(75) Inventors: Christopher D. Lopes, Fredericksburg, VA (US); Dale K. Kotter, Shelley, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 452 days.

(21) Appl. No.: 11/398,744

(22) Filed: Mar. 28, 2006

Related U.S. Application Data

(60) Provisional application No. 60/709,835, filed on Aug. 18, 2005.

(51) Int. Cl.
*H01Q 15/02* (2006.01)

(52) U.S. Cl. .................. 343/909; 343/700 MS

(58) Field of Classification Search .......... 343/700 MS, 343/909, 895, 795, 853
See application file for complete search history.

(56) References Cited

U.S. PATENT DOCUMENTS

| | | | | |
|---|---|---|---|---|
| 6,061,025 A | * | 5/2000 | Jackson et al. | 343/700 MS |
| 6,278,410 B1 | | 8/2001 | Soliman et al. | 343/769 |
| 6,292,153 B1 | | 9/2001 | Aiello et al. | 343/767 |
| 6,559,810 B2 | | 5/2003 | McCorkle | 343/795 |
| 7,312,763 B2 | * | 12/2007 | Mohamadi | 343/853 |

OTHER PUBLICATIONS

Monacelli et al., "Infrared Frequency Selective Surfaces: Design, Fabrication and Measurement", *Proceedings of SPIE*, v. 5406, © SPIE Aug. 2004, pp. 879-886.
Monacelli et al., "Infrared Frequency Selective Surface Based on Circuit-Analog Square Loop Design", *IEEE Transactions on Antennas and Propagation*, v. 53, No. 2, © IEEE Feb. 2005, pp. 745-752.
González et al., "Antenna-Coupled VOx Thin-Film Microbolometer Array", *Microwave and Optical Technology Letters*, v. 38, No. 3, Aug. 5, 2003, pp. 235-237.
González et al., "Antenna-Coupled Infrared Detectors for Imaging Applications", *IEEE Journal of Selected Topics in Quantum Electronics*, v. 11, No. 1, Jan./Feb. 2005, pp. 117-120.
Govindaswamy et al., "Frequency-Selective Surface Based Bandpass Filters in the Near-Infrared Region", *Microwave and Optical Technology Letters*, v. 41, No. 4, May 20, 2004, pp. 266-269.
Hooberman, "Everything You Ever Wanted to Know About Frequency-Selective Surface Filters but Were Afraid to Ask", calvin.phys.columbia.edu/group_web/filter.pdf, May 2005, pp. 1-22.

* cited by examiner

*Primary Examiner*—HoangAnh T Le
(74) *Attorney, Agent, or Firm*—Gerhard W. Thielman, Esq.; Marguerite O. Dinee, Esq.

(57) ABSTRACT

Various embodiments are described relating to a portable antenna-equipped device for multi-band radar detection. The detection device includes a plurality of antennas on a flexible substrate, a detection-and-control circuit, an indicator and a power source. The antenna may include one or more planar lithographic antennas that may be fabricated on a thin-film substrate. Each antenna may be tuned to a different selection frequency or band. The antennas may include a bolometer for radar detection. Each antenna may include a frequency selective surface for tuning to the selection frequency.

20 Claims, 2 Drawing Sheets

300
EXAMPLE ANTENNA ARRAY

US 7,436,373 B1

PORTABLE RECEIVER FOR RADAR DETECTION

CROSS-REFERENCE TO RELATED APPLICATION

Pursuant to 35 U.S.C. §119, the benefit of priority from provisional application 60/709,835, with a filing date of Aug. 18, 2005, is claimed for this non-provisional application.

STATEMENT OF GOVERNMENT INTEREST

The invention described herein may be manufactured and used by or for the Government of the United States of America for governmental purposes without the payment of any royalties thereon or therefor.

BACKGROUND

Radar is frequently used for search and rescue (SAR) operations. The microwave frequencies employed for radar typically range between 100 MHz (wavelength λ of ~10 m) and 100 GHz (λ of ~1 mm) that straddles across the overlapping radio and thermal infrared frequency bands. Because humans inherently lack organic senses for microwave energy frequencies, an individual being sought cannot determine unaided whether sufficient the radar illumination has enabled successful detection.

Current radar detection systems typically employ a single antenna for each band of interest. These systems are typically large, heavy, specially tailored to aviation or maritime applications and may require dedicated power sources, special cooling, and the like. Such systems may incorporate multiple antennas and modulators tuned to the search frequency bands, thereby increasing weight and volume, further compromising portability for human transport.

SUMMARY

Various embodiments are described relating to portable antenna device for radar detection. An example embodiment provides multiple antennas, with each antenna tuned to a specific radar frequency.

According to an example embodiment, a multi-band radar detection device includes a plurality of antennas on a flexible substrate, a detection-and-control circuit, an indicator and a power source. The antenna may include one or more planar lithographic antennas that may be fabricated on a thin-film substrate. Each antenna may be tuned to a different frequency or band.

A detector may be integrated into the antenna structure using a bolometer material. Each antenna may receive radiant energy at a particular frequency or band, such as for radar. The detection-and-control circuit may discriminate between the signals received at different frequencies or bands, and may activate one or more corresponding indicators.

According to an example embodiment, a frequency selective surface (FSS) may be used to detect signals in the radar range (e.g., 1-50 GHz) to facilitate filtering of radar signals at different frequencies or bands. One or more antenna arrays may include FSS components as antenna elements. Each antenna array may have a particular geometry and size to be tuned to a specific frequency or band to allow the detection of radar signals at different signals.

DETAILED DESCRIPTION

Figure 1:
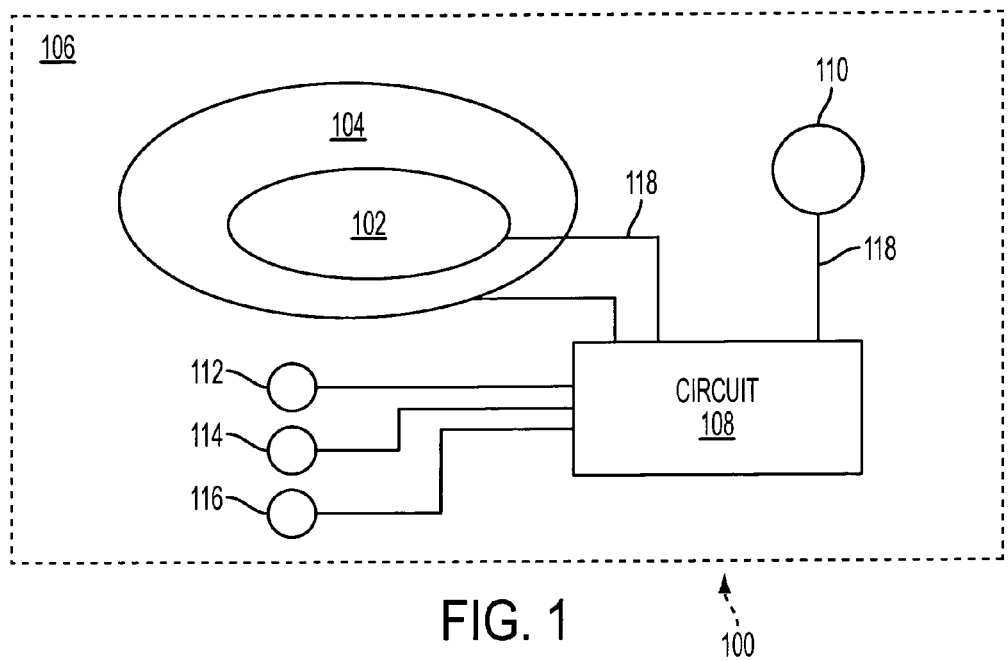
FIG. 1 is a plan view diagram illustrating a multi-band radar detection device according to an example embodiment.

Referring to the Figures in which like numerals indicate like elements, FIG. 1 is a diagram illustrating a multi-band radar detection system according to an example embodiment. Multi-band radar detection device 100 may include a plurality of antennas, such as co-planar antennas 102 and 104 for collecting or receiving electromagnetic energy from separate frequencies.

The antennas 102, 104 may be disposed on a surface of a flexible electrically resistive substrate 106. As shown, the antenna 104 may form a periphery around or encompass a region that overlaps the antenna 102. In an alternative arrangement, the antennas 102, 104 may cover separate non-overlapping regions on the substrate 106.

Alternatively, a radar detection system as contemplated may incorporate a single antennae 102. The antennas 102, 104 may be printed or lithographed in patterned arrays as an electrically conductive film (e.g., metal) onto the surface of the substrate 106. Kapton® polyimide film from DuPont represents an exemplary material for the flexible substrate 106, which electrically insulates the antennas 102, 104.

A detection-and-control circuit 108 may be coupled to the antennas 102, 104 to perform detection and overall control. The circuit 108 typically requires an amplifier. The detection-and-control circuit 108 receives signals from each antenna (e.g., from antennas 102, 104). Upon reception of radar signals of a particular frequency by the corresponding antenna (102 or 104), the detection-and-control circuit 108 may detect these radar signals.

For example, if the antenna 102 is tuned (e.g., based on size and geometry of antenna or antenna elements) to frequency $f_1$ and the antenna 104 is tuned to frequency $f_2$, the detection-and-control circuit 108 may detect radar signals at frequency $f_1$ based on signals from the antenna 102, and may detect radar signals at frequency $f_2$ based on signals from the antenna 104.

The detection-and-control circuit 108 may activate one or more of indicators 112, 114, 116 in response to detecting radar signals at particular frequencies (e.g., based on signals received from the antennas 102, 104). The indicators 112, 114, 116 may include an audio indicator such as a speaker or other device to provide an audio output (e.g., different audible tone or other audio signal for each detected frequency). The indicators 112, 114, 116 may also be a visual indicator, such as a different color light emitting diode (LED) for each frequency, or a tactile or physical indication (e.g., human sensible vibration or pulse).

A battery 110 (or other electrical power source) provides electrical power to the various circuits and components of multi-band radar detection device 100. The battery 110 may be a small battery with a low aspect ratio such as a button battery for a watch. The battery 110 may provide a trickle charge for a fast-response capacitor connected to the circuit 108.

Although search radars impart energy to the environment, the incident power density funneled to the antennas 102, 104 at typical operational ranges cannot supply sufficient energy to activate the circuit 108 and the indicators 112, 114, 116 absent a supplemental power source. For a passive system, a fast-response capacitor may charge the tag from energy collected by a large array of antennas.

One or more signalers (e.g., audio, visual or tactile or physical signal generators), such as indicators 112, 114, 116 are coupled to detection-and-control circuit 108. Small conductive wire traces 118 on the substrate 106 similar to connections used in integrated circuit boards may be used to couple the circuit 108 and the associated components. These traces 118 may be coated with plastic epoxy for their protection from environmental conditions.

The indicators 112, 114 may be directly associated with their corresponding antennas 102, 104 to identify the particular frequency detected. Alternatively, the indicators 112, 114, 116 may represent a collective set of alarms in sundry media (e.g., visible, audio, tactile) corresponding to detection in any of the frequencies received by the antennas 102, 104.

The circuit 108 may incorporate functions of a readout integrated circuit (ROIC), particularly for indicators that exhibit an alpha-numeric display. In exemplary embodiments however, the indicators 112, 114, 116 provide a simple on or off signal to minimize control logic and power.

The device 100 may preferably be contained within the dimensions of a typical business card (78 mm×45 mm) or service-personnel flag patch (67 mm×45 mm). For operational radar detection in the search-and-rescue application, the Ka band between 33.4 GHz and 36.0 GHz, particularly 34 GHz (corresponding to a wavelength of ~8.5 mm) represents a preferable frequency regime. Thus, antennas 102, 104 tuned to the Ka band may fit within a business card area without employing expensive fractal or meanderline antenna designs.

Alternatively, other frequency ranges may be employed, including microwave (e.g., Bluetooth/IEEE-802.15 at 2.402-2.480 GHz, wavelength ~0.125 m), X band (10.475-10.575 GHz, wavelength ~30 mm), K band (24.0-24.25 GHz, wavelength ~12.5 mm), and millimeter long-infrared THz bands. The antennas 102, 104 correspond to linear dimensions of about one wavelength.

Each of antennas 102, 104 may be tuned to be sensitive to a particular frequency or band due to their size and geometry (or shape). Thus, antennas 102, 104 may have different sizes and geometries so as to be tuned to different frequencies. This may allow the multi-band radar detection device 100 to detect radar signals at different frequencies or bands.

According to an example embodiment, each of the antennas 102, 104 may include a coplanar array of antenna elements, with each element of the array having a size and geometry tunable to a specific frequency or band. For example, the first and second antennas 102, 104 may each include a coplanar array of a plurality of antenna elements with the elements having corresponding sizes and/or geometries for tuning to first and second frequencies, respectively. The example shown in FIG. 1 illustrates only two antennas 102, 104, but any number of antennas or antenna arrays may be used within the inventive scope.

The incident electromagnetic radiation from radar will typically induce millimeter-frequency current waves to flow in the arms of the antenna, along the direction of the incident electric field. The induced current waves will propagate along the antenna arms, producing voltage across the sensor material, thereby enabling capture of the incident radiation. The antenna can be formed out of any appropriate conductive metal, using standard planar lithography technologies.

The indicators 112, 114, 116 may constitute different media to signal an alert, or alternatively may operate in the same mode as the neighboring indicators for detection of separately defined frequencies. A different indication may be provided for detection of each different frequency, e.g., lighting or flashing a different LED, providing a different audio tone, or providing a different tactile output.

For example, a red LED may be lit in response to detecting radar signals at a first frequency, a blue LED may be lit in response to detecting radar signals at a second frequency, and a green LED may be lit in response to detecting radar signals at a third frequency.

These LED signals may provide the user with an indication of the frequency of radar signals that was detected multi-band radar detection device 100. For example, land-based and airborne radar systems may employ distinct frequency bands. Therefore, activating a different indicator in response to different radar frequencies may provide useful information to the user.

Figure 2:
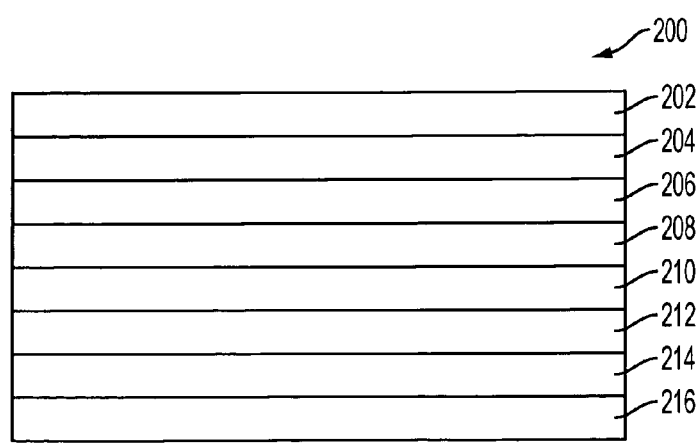
FIG. 2 is an elevation view diagram illustrating exemplary stacked antenna arrays 200 used in the multi-band radar detection device of FIG. 1.

FIG. 2 is a diagram illustrating an arrangement of stacked antenna arrays 200 which may be used in the multi-band radar detection system according to an example embodiment. In particular, an antenna array stack 200 includes several antenna array layers including 202, 204, 206, 208, 210, 212, 214, 216 with one of the outermost layers 202, 216 to be disposed on the substrate 106. The quantity of arrays shown is exemplary only and not intended as limiting.

These antenna arrays do not interfere with (e.g., defocus, scatter) signal reception of their neighboring layers due to the antennas being offset from each other within their arrays. In addition, the antennas within their arrays are tuned their individually tuned frequencies. Johnson noise, associated with infrared frequencies in smaller antennas, does not affect the applications for these embodiments. Thus, design constraints from ganged antenna elements and phased arrays may be obviated by avoiding direct antenna overlay.

Each of these stacked or overlapping antenna arrays may include elements having a size and geometry that are tuned to receive or be sensitive to a particular frequency. For example, the array 202 may include elements having a size and geometry that are tuned to frequency $f_1$. Likewise, the array 204 may be tuned to frequency $f_2$, the array 206 may be tuned to frequency $f_3$, and the array 208 may be tuned to frequency $f_4$. Similarly, the arrays 210, 212, 214, 216 may each include elements being sized and shaped for tuning to their specific frequencies.

The antenna structure may integrate detection capability with radar signal reception by configuring the array as a bolometer or a micro-bolometer. Each antenna 102, 104 may receive radiant energy at a particular frequency or within a band, such as for radar.

The bolometer consists of a radiation-sensitive resistance element in one branch of a Wheatstone bridge. Radiation that strikes the bolometer element changes its electrical resistance. This change is based on the design of the antenna and conductivity characteristics of its material, thereby enabling detection of the received radar energy to be forwarded to the circuit 108.

For example, the radiation-sensitive bolometer element may be formed, e.g., of a platinum strip, a semiconductor film. The impedance of the bolometer design may be empirically derived by comparing rates of sputter deposition and resulting thickness while measuring the standing wave ratio of the antenna.

The antenna arrays may employ a wide range of thicknesses provided the material has low ohmic loss. Each antenna may form a spiral having an impedance of about 50Ω (ohms) within the bolometer patch. Preferably, the antenna array structures would be on the order of 1 μm with the bolometer being applied as a rectangular patch on the substrate. The bolometer thickness may depend on the sheet resistance of the substrate and match the impedance of the antenna.

Planar frequency selective surface (FSS) devices have been used in the infrared (IR) frequency range (Terahertz or THz) for thermal measurement applications. For example, see "Infrared Frequency Selective Surfaces: Design, Fabrication and Measurement" by B. Monacelli, J. B. Pryor, B. A. Munk, D. Kotter and G. D. Boreman, *Proceedings of SPIE*, v. 5406, B. F. Andresen, G. B. Fulop, eds., © SPIE August 2004, pp. 879-886 for Apr. 12-16, 2004 Infrared Technology and Applications XXX Conference.

An FSS, also known as a dichroic surface, consists of elements arranged in a planar periodic array to create a bandpass or bandstop filter for plane waves at any angles of incidence. These elements may form an array of patterned shapes, e.g., cruciform, hollow rectangle, etc., and can be constructed as printed-circuit elements on a dielectric substrate, such as by lithographic techniques.

Each antenna may include an FSS layer for tuning to the selection frequency. Separate FSS layers may be superposed over each other to bandstop several different frequencies. FSS layers may be produced for radar frequency applications, such as in the arrays 202, 204, 206, 208, 210, 212, 214 and 216 in various embodiments.

Figure 3:
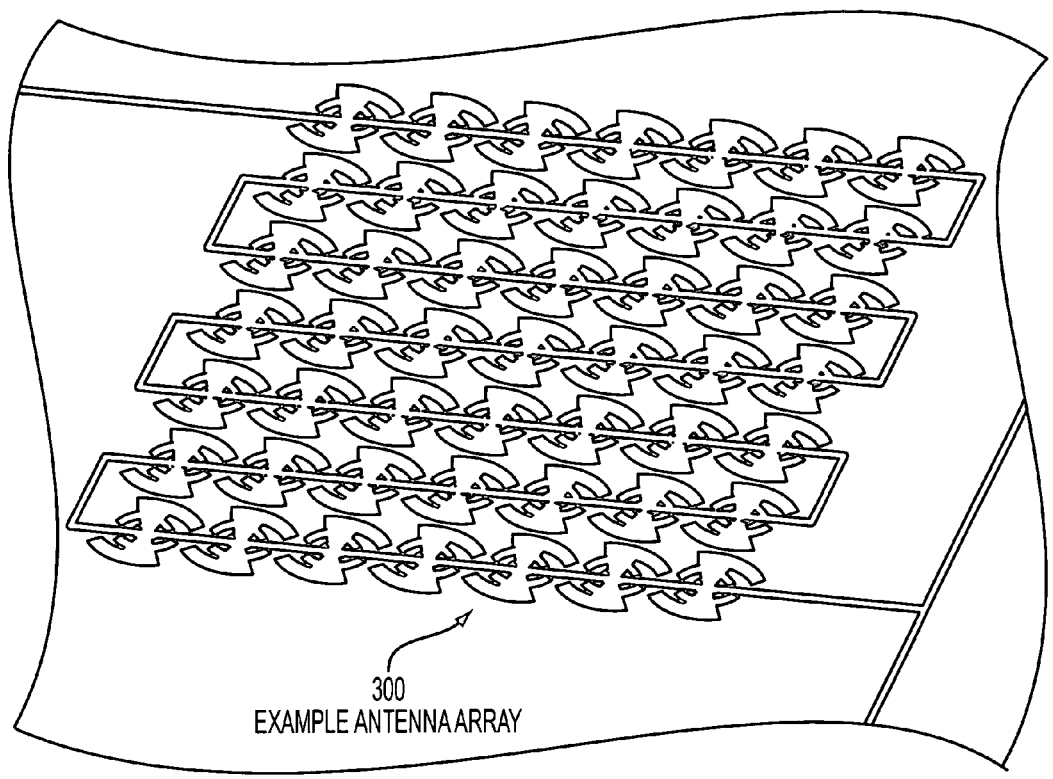
FIG. 3 is an isometric illustration of an exemplary antenna array 300 used as one or more of the arrays in FIG. 2.

FIG. 3 is a diagram illustrating an example antenna array 300 which may be used as one or more of the arrays in FIG. 2. The antenna array 300 may be provided as rows and columns, with an element provided at an intersection of each row and column. There may be tens, hundreds, or even thousands (for example) of elements in the antenna array 300. The array shown in FIG. 3 is an example array and the present disclosure is not limited thereto. Array 300 may use elements having a wide variety of shapes and sizes, such as spiral, bowtie, dipole, loop, slot, etc.

Figure 4:
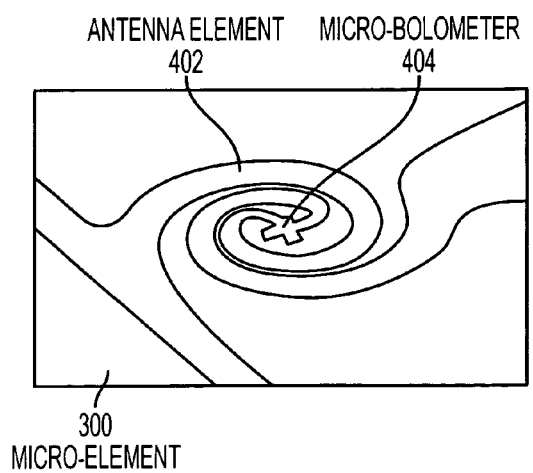
FIG. 4 is an isometric illustration of an exemplary element 400 (or micro-element) of an array used in the array 300 shown in FIG. 3.

FIG. 4 is a diagram of an element 400 of an array 300 (FIG. 3) according to an example embodiment. In this example embodiment, the element 400 is a spiral element that includes an antenna element 402 for receiving or collecting radar signals or radar energy, and a micro-bolometer 404 to measure the intensity of radiant energy.

The bolometer 404 may be made from temperature sensitive material. The resistance of the bolometer 404 may change based on the radar signal received or collected by antenna element 402. An electrical signal output from the bolometer 404 may therefore change based on the radar signals received or collected by the antenna element 402.

The spiral configuration for the bolometer 404 in FIG. 4 shows a three-way element, with all three paths connected by a conducting metal bridge as an exemplary embodiment. The leads of the bolometer may be connected to a detection circuit, one for the signal and the other to ground. The bolometer can be electrically monitored as a balanced Wheatstone bridge circuit with the resistance of the bolometer as one leg of the bridge.

Excitation by microwave energy superimposes a current difference to the spiral antenna. The antenna arms conduct the current to measure the resulting change in current across the bolometer from the difference between a reference bias voltage and the microwave-induced voltage. FIG. 3 shows antenna array elements without bolometer elements incorporated.

In a conventional bolometer the surface of the absorber will typically be at least one square wavelength in area to efficiently receive radiation. This large area equates to a large thermal mass and slow response. This distribution results in marginal sensitivity and response times for burst radar detection applications, but mitigates against burnout.

According to an example embodiment, the disclosed antenna-coupled micro-bolometer technology may compensate for the limitations of bolometers. Radar energy may be focused by a lithographic antenna onto an absorber element (micro-bolometer) that is typically several orders of magnitude smaller than a wavelength in size. This may result in a bolometer with small thermal mass and fast response characteristics.

In principle, the radar radiation may be received by a macro-antenna, which is physically designed for operation in the desired frequency bands. When in the field of view, the radar antenna receives the energy and goes into a resonance mode.

The excitation of the antenna by electromagnetic radiation induces current waves that propagate through the arms of the antenna. The antenna may be feed-point coupled to a bolometer detector. The induced antenna current flows into the bolometer. The absorbed power causes a fast-response temperature rise in the bolometer element, providing real-time response to radar.

For example, if a known or substantially constant voltage is applied across the micro-bolometer 404, a change in the bolometer's resistance (e.g., due to received radiant energy or radar signals), will change the current output from micro-bolometer 404. Similarly, if a known or substantially constant current is passing through the bolometer, any change in the resistance of micro-bolometer 404 will typically change the voltage drop across micro-bolometer 404.

These changes in the electrical signals (e.g., change in current or voltage) output from each micro-bolometer 404 in the array 300 may be determined by detection-and-control circuit 108. In this manner, each antenna array, which may have elements 400 of a specific size and geometry tuned to a specific frequency, may output electrical signals (e.g., voltages or current) to the detection-and-control circuit 108 indicating the presence or absence of radar signal at the respective (tuned) frequencies. The detection-and-control circuit 108 may then activate the appropriate indicators (e.g., 112, 114, 116) based on the received signals, indicating whether radar energy or signals at particular frequencies have been detected.

According to an example embodiment, the multi-band radar detection device 100 may be provided on a small-area substrate 106, which may be, for example, about 4 cm (wide)×6 cm (long)×0.5 cm (thick). The antenna array(s) may be fabricated on a semiconductor substrate or as part of a semiconductor device. According to an example embodiment, the multi-band radar detection device 100 may provide a small form factor, a coplanar array of radar antennas 102, 104 with integrated power (from e.g., battery 110), logic (e.g., detection-and-control circuit 108) and alarm indication (e.g., indicators 112, 114, 116).

The antennas 102, 104 may be tuned to specific bands or frequencies by their size and geometry, for example. Each antenna may be tuned to a different frequency or band. Thus, a single device is provided that is capable of detecting multi-band radar signals. The device may be small, light, low power and man-portable. Multiple antennas are provided in a coplanar array to sense multi-band radar energy.

In an example embodiment, each antenna may be provided as an array of elements. Each element may include, for example, an antenna element and either a bolometer or a micro-bolometer. The use of multiple stacked antenna arrays may reduce angle of incidence limitations or provide gross bearing indication of incoming radar energy. Non-coplanar conformal arrays that may function while attached to irregular or changing surfaces may also be used.

According to an example embodiment, multi-band radar detection device 100 may detect radar signals or radiant energy in the range of 1 GHz-50 GHz. In another embodiment, multi-band radar detection device 100 may also detect radar signals or radiant energy in the range of 10 GHz-30 GHz. These are examples, and the present disclosure is not limited thereto.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A multi-band radar detection device to detect radiant energy signals at a plurality of radar frequencies, the device comprising:
   an electrically-resistive substrate;
   a plurality of antennas disposed on the substrate for receiving the radar signals at tuned frequencies, each antenna tuned to one of a distinct frequency and a distinct frequency band;
   a detection-and-control circuit connected to the plurality of antennas, the circuit determining whether presence of the radar signal at a detection frequency corresponding to at least one of the tuned frequencies;
   an indicator to indicate the presence of the detected radar signal determined by the circuit; and
   a power source to provide power to the indicator and the circuit.

2. The device of claim 1, wherein
   each of the antennas comprises an antenna array of elements, and
   each element is tuned to receive the radiant energy signals at the tuned frequencies based on the element having a corresponding size and geometry corresponding to the one of the distinct frequency and the distinct frequency band.

3. The device of claim 1, wherein each of the antennas comprises:
   an antenna signal receiving element; and
   a bolometer, the circuit being responsive to the bolometer.

4. The device of claim 1, wherein each of the antennas comprises an antenna signal element arranged as a frequency selective surface array.

5. The device of claim 1, wherein the antennas are adapted to receive radar energy signals in the range 1 GHz to 50 GHz.

6. The device of claim 5, wherein the antennas are adapted to receive radar energy signals in the range 10 GHz to 30 GHz.

7. The device of claim 1, wherein the indicator comprises a plurality of frequency-specific indicators, each of the plurality of indicators being associated with a corresponding antenna of the plurality of antennas.

8. The device of claim 7, wherein each of the plurality of indicators is a light emitting diode corresponding to a distinct color associated with the corresponding antenna.

9. The device of claim 1, wherein the indicator comprises a plurality of indicators, each of the plurality of indicators corresponding to a distinct medium to indicate the presence of the detected radar signal.

10. The device of claim 1, wherein the indicator produces an audible audio signal to indicate the presence of the detected radar signal.

11. The device of claim 10, wherein the indicator produces a tactile signal to indicate the presence of the detected radar signal.

12. The device of claim 11, wherein the indicator produces the tactile signal as a humanly sensible vibration.

13. The device of claim 11, wherein the indicator produces the tactile signal as a humanly sensible pulse.

14. The device of claim 1, wherein the indicator produces a visual signal to indicate the presence of the detected radar signal.

15. The device of claim 14, wherein the indicator is a light emitting diode.

16. The device of claim 15, wherein the light emitting diode illuminates in response to the circuit determining the presence of the detected radar signal at any of the tuned frequencies.

17. The device of claim 1, wherein the substrate has planar dimensions of about 4 cm×6 cm and a thickness of about 0.5 cm.

18. The device of claim 1, wherein the substrate is flexible.

19. The device of claim 1, wherein the substrate is composed of a polyimide film.

20. The device of claim 19, wherein the antennas comprise metal layers disposed onto the substrate by photolithography.

* * * * *